(12) United States Patent
Ohta et al.

(10) Patent No.: US 7,939,612 B2
(45) Date of Patent: May 10, 2011

(54) RADICALLY POLYMERIZABLE COMPOUND HAVING A CYCLIC DITHIOCARBONATE GROUP

(75) Inventors: Keisuke Ohta, Oita (JP); Yasuyuki Oyama, Oita (JP); Kazufumi Kai, Oita (JP)

(73) Assignee: Showa Denko K.K., Tokyo (JP)

( * ) Notice: Subject to any disclaimer, the term of this patent is extended or adjusted under 35 U.S.C. 154(b) by 525 days.

(21) Appl. No.: 12/159,045

(22) PCT Filed: Jan. 26, 2007

(86) PCT No.: PCT/JP2007/051752
§ 371 (c)(1),
(2), (4) Date: Jun. 24, 2008

(87) PCT Pub. No.: WO2007/086607
PCT Pub. Date: Aug. 2, 2007

(65) Prior Publication Data
US 2009/0270574 A1    Oct. 29, 2009

(30) Foreign Application Priority Data

Jan. 27, 2006    (JP) .................................. 2006-018903

(51) Int. Cl.
*C08F 28/06* (2006.01)
*C08F 228/06* (2006.01)
*C07D 339/06* (2006.01)

(52) U.S. Cl. ............. 526/256; 526/257; 549/35; 549/37

(58) Field of Classification Search .................. 526/256, 526/257; 549/35, 37
See application file for complete search history.

(56) References Cited

U.S. PATENT DOCUMENTS

| | | | |
|---|---|---|---|
| 4,775,733 A | 10/1988 | Kanemura et al. | |
| 6,372,871 B1 * | 4/2002 | Jimbo et al. | 526/257 |
| 6,794,471 B2 | 9/2004 | Ohkuma et al. | |

FOREIGN PATENT DOCUMENTS

| | | |
|---|---|---|
| JP | 03-217412 A | 9/1991 |
| JP | 2004-323702 A | 11/2004 |

OTHER PUBLICATIONS

STN Search Results (Dec. 29, 2010).*
Wonmun Choi, et al., "A Novel Construction of Living Polymerization by Neighboring Group Participation: Living Cationic Ring-Opening Polymerization of a Five-Membered Cyclic Dithiocarbonate", Macromolecules, 1998, pp. 9093-9095, vol. 31, No. 25.
Bungo Ochiai, et al., "Carbon dioxide and carbon disulfide as resources for functional polymers", Progress in Polymer Science, 2005, pp. 183-215, vol. 30, No. 2, Pergamon Press.

* cited by examiner

*Primary Examiner* — David Wu
*Assistant Examiner* — Vu A Nguyen
(74) *Attorney, Agent, or Firm* — Sughrue Mion, PLLC

(57) ABSTRACT

A radically polymerizable compound having a group represented by formula (1)

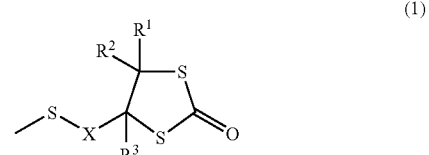

(1)

(In the formula, $R^1$ to $R^3$ each independently represents a hydrogen atom or an alkyl group having 1 to 4 carbon atoms, X represents an alkylene group having 1 to 4 carbon atoms.) and a radically polymerizable double bond and a composition for an optical material comprising the same have a high refractive index and excellent transparency and are hard to be oxidized in thermal curing and useful as an optical material with little tinting.

20 Claims, No Drawings

RADICALLY POLYMERIZABLE COMPOUND HAVING A CYCLIC DITHIOCARBONATE GROUP

CROSS REFERENCE TO RELATED APPLICATION

This application is a National Stage of International Application No. PCT/JP2007/051752 filed on Jan. 26, 2007, claiming priority based on Japanese Patent Application No. 2006-018903, filed Jan. 27, 2006, the contents of all of which are incorporated herein by reference in their entirety.

TECHNICAL FIELD

The present invention relates to a radically polymerizable compound having a cyclic dithiocarbonate group, a mercapto compound having a cyclic dithiocarbonate group and an optical material using the radically polymerizable compound, which has a high refractive index.

BACKGROUND ART

Conventionally, as organic glass, which is light as compared with inorganic glass, polymers of diethyleneglycol bis (allylcarbonate) such as CR-39 (product name, manufactured by PPG Industries) and polymers of methyl methacrylate are used. The higher the refractive index of the glass is, the further reduced the thickness of the lens can be. The refractive indices of these organic glasses are in a range of 1.49 to 1.50, relatively low as compared with inorganic glasses (in case of white crown glass, the refractive index is 1.523.) Therefore, in a case where lens is prepared from an organic glass, the edge is thick as compared with a case where inorganic glass is used and therefore, advantages of weight reduction are decreased. Moreover, in a case where an organic glass is used for vision correction lens for high degree, there is a disadvantage that the look of the lens is bad. For this reason, resin for optical material giving polymer with high refractive index has been desired.

In terms of method for enhancing refractive index of an organic glass, various attempts have been made so far. For example, in Japanese Patent Application Laid-Open No. S63-46213 (U.S. Pat. No. 4,775,733), as an optical resin which can impart high refractive index, thiourethane-base resin obtained by reacting isocyanate compound with mercapto compound is described. But there are problems with thiourethane-base resin that isocyanate compound serving as raw material is toxic and that thiol compound serving as raw material has an odor.

Further, in Japanese Patent Application Laid-Open No. 3-217412, (meth)acrylate compound containing sulfur atom is described as material giving high refractive index. Although these materials can provide a relatively high refractive index, the refractive index is not necessarily high enough.

Furthermore, in Japanese Patent Application Laid-open No. 2002-275216 (U.S. Pat. No. 6,794,471), a (meth)acrylate compound having dithiolane ring structure which enables high refractive index is proposed. The refractive indices of these compounds are high. However, since their structures include sulfide, good photocuring can be obtained but sulfide tends to be oxidized in molding process through thermal curing with peroxide as initiator and therefore, control of polymerizability is not necessarily satisfactory.

In addition, in Japanese Patent Application Laid-Open No. 2004-323702, copolymer of (meth)acrylate compound having a cyclic dithiocarbonate structure and isobornyl (meth) acrylate compound is disclosed. However, such a copolymer cannot be said to give a sufficiently high refractive index in some technical fields where the compound is used, either.

DISCLOSURE OF INVENTION

The object of the present invention is to provide an optical material with a high refractive index and excellent transparency and involving little heat tinting at the time of thermal curing reaction.

As a result of intensive studies with a view to solving the above problems, the present inventors have found out that a radically polymerizable compound having a specific cyclic dithiocarbonate structure can give an optical material having a high refractive index, excellent in transparency, hardly oxidized and involving little heat tinting at the time of thermal curing reaction, and thereby they have completed the present invention.

That is, the present invention relates to the following items 1 to 20.

1. A radically polymerizable compound, comprising a group represented by formula (1) and a radically polymerizable double bond.

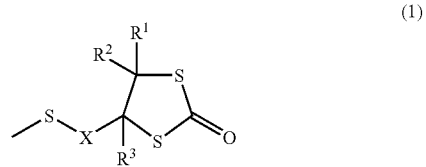

(1)

(In the formula, $R^1$ to $R^3$ each independently represents a hydrogen atom or an alkyl group having 1 to 4 carbon atoms, X represents an alkylene group having 1 to 4 carbon atoms.)

2. The radically polymerizable compound as described in above 1, wherein $R^1$ to $R^3$ in the formula are hydrogen atoms and X is a methylene group.

3. The radically polymerizable compound as described in above 1, which is represented by formula (2).

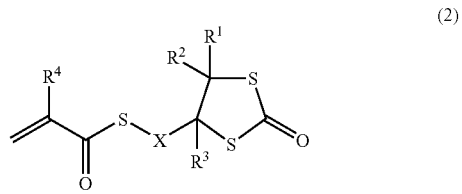

(2)

(In the formula, $R^1$ to $R^3$ each independently represents a hydrogen atom or an alkyl group having 1 to 4 carbon atoms, X represents an alkylene group having 1 to 4 carbon atoms. $R^4$ represents a hydrogen atom or an alkyl group having 1 to 4 carbon atoms.)

4. The radically polymerizable compound as described in above 3, wherein $R^1$ to $R^3$ in formula (2) are hydrogen atoms, $R^4$ is a methyl group and X represents a methylene group.

5. A polymer of the radically polymerizable compound as described in any one of above 1 to 4.

6. A copolymer of the radically polymerizable compound as described in any one of above 1 to 4 and other radically polymerizable compounds.

7. A copolymer of the radically polymerizable compound as described in any one of above 1 to 4 and at least one radically polymerizable monomer selected from the group consisting of methyl(meth)acrylate, ethyl(meth)acrylate, n-butyl(meth)acrylate, i-butyl(meth)acrylate, t-butyl (meth)acrylate, 2-ethylhexyl (meth)acrylate, lauryl(meth) acrylate, stearyl(meth)acrylate, isobornyl (meth)acrylate, cyclohexyl (meth)acrylate, tetrahydro furfuryl (meth)acrylate, trimethylolpropane tri(meth)acrylate, dicyclopentanyl (meth)acrylate, dicyclopentenyl (meth)acrylate, dicyclopentenyloxy ethyl(meth)acrylate, ethyleneglycol di(meth)acrylate, 1,4-butanediol di(meth)acrylate, 1,6-hexanediol di(meth)acrylate, 1,9-nonanediol di(meth) acrylate, neopentylglycol di(meth)acrylate, polyethyleneglycol di(meth)acrylate, tricyclodecane dimethanol di(meth)acrylate and ethoxylated cyclohexane dimethanol di(meth)acrylate.
8. A composition for optical material containing the radically polymerizable compound described in any one of above 1 to 4.
9. A method for producing the radically polymerizable compound described in above 3, wherein a mercapto compound represented by formula (3) is allowed to react with a (meth)acryloyl halide.

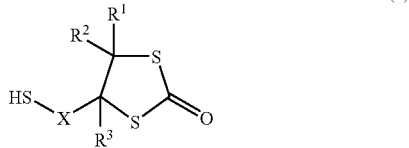

(3)

(In the formula, $R^1$ to $R^3$ each independently represents a hydrogen atom or an alkyl group having 1 to 4 carbon atoms. X represents an alkylene group having 1 to 4 carbon atoms.)
10. A method for producing the radically polymerizable compound described in above 3, wherein a mercapto compound represented by formula (3) is allowed to react with a halide of halopropionic acid to prepare halopropionic acid thioester and then the halopropionic acid thioester is subjected to dehydrohalogenation.
11. A mercapto compound, wherein at least one of $R^1$ to $R^3$ in formula (3) is not a hydrogen atom.
12. A mercapto compound, wherein X in formula (3) is a methylene group.
13. A mercapto compound, wherein at least one of $R^1$ to $R^3$ in formula (3) is not a hydrogen atom and X is a methylene group.
14. The composition for optical material described in above 8, which is used in light waveguide, optical lens, optical sealant, optical adhesive, optical film or light guide plate.
15. A light waveguide obtained from the composition for optical material described in above 8.
16. An optical lens obtained from the composition for optical material described in above 8.
17. An optical sealant obtained from the composition for optical material described in above 8.
18. An optical adhesive obtained from the composition for optical material described in above 8.
19. An optical film obtained from the composition for optical material described in above 8.
20. An optical light guide plate obtained from the composition for optical material described in above 8.

The present invention provides an optical material having a high refractive index, excellent in transparency, which is stable and involves little heat tinting at the time of thermal curing reaction. The radically polymerizable compound and composition for optical material according to the present invention, which give a high refractive index when cured, are particularly useful as material for optical lenses such as lens of spectacles and camera lens and as optical material for light waveguide, optical sealant, optical adhesive, optical film, prism, light guide plate for liquid crystal panel, optical fiber and the like.

BEST MODE FOR CARRYING OUT THE INVENTION

The present invention is explained in details below.
<Radically Polymerizable Compound Comprising a Cyclic Dithiocarbonate Group and a Radically Polymerizable Double Bond>

The radically polymerizable compound of the present invention has a cyclic dithiocarbonate group represented by formula (1) and a radically polymerizable double bond.

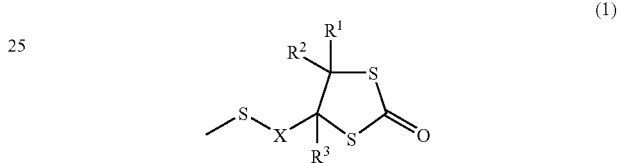

(1)

(In the formula, $R^1$ to $R^3$ each independently represents a hydrogen atom or an alkyl group having 1 to 4 carbon atoms, X represents an alkylene group having 1 to 4 carbon atoms.)

In formula (1), $R^1$ to $R^3$ each independently represents a hydrogen atom or an alkyl group having 1 to 4 carbon atoms. Specific examples thereof include a hydrogen atom, methyl group, ethyl group, n-propyl group, isopropyl group, n-butyl group, isobutyl group and t-butyl group.

In terms of enhancing the refractive index, hydrogen atom and methyl group are preferred.

In formula (1), X represents an alkylene group having 1 to 4 carbon atoms. Specific examples thereof include methylene group, ethylene group, propylene group and butylene group. Also, such an alkylene group may have an alkyl group branched at the 1 to 4 carbon atoms. Among these alkylene groups, in terms of enhancing the refractive index, methylene group is most preferred.

Examples of radically polymerizable double bonds include a group having an ethylenic carbon-carbon double bond. Above all, (meth)acryloyl group, styryl group and (meth)allyl ester group are preferred in that these groups can form a direct bond with cyclic dithiocarbonate group in formula (1). Here, the term (meth)acryloyl may mean both methacryloyl or acryloyl. Similar definition is applied to the term "(meth)acryl" and "(meth)allyl" used here.

The radically polymerizable compound having a group(s) represented by formula (1) and radically polymerizable double bond is not particularly limited as far as the cyclic dithiocarbonate group and the radically polymerizable double bond are present in molecules.

At least one cyclic dithiocarbonate group and at least one radically polymerizable double bond must be present in one molecule, but two or more of each of them may be present in a single molecule. A preferred example is a compound represented by formula (2) below.

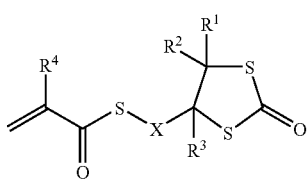

(2)

(In the formula, $R^1$ to $R^3$ represents the same as in formula (1). $R^4$ represents a hydrogen atom or an alkyl group having 1 to 4 carbon atoms.)

Specific examples of compound represented by formula (2) include compounds represented by formulae (4) to (7) below, but are not limited thereto.

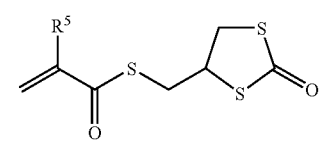

(4)

(In the formula, $R^5$ represents a hydrogen atom or a methyl group.)

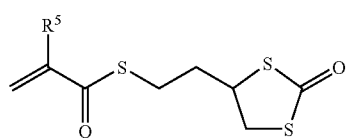

(5)

(In the formula, $R^5$ represents a hydrogen atom or a methyl group.)

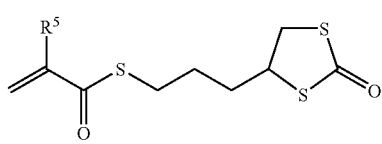

(6)

(In the formula, $R^5$ represents a hydrogen atom or a methyl group.)

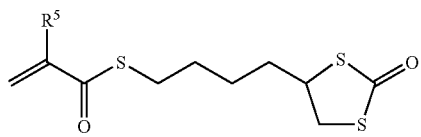

(7)

(In the formula, $R^5$ represents a hydrogen atom or a methyl group.)

Among these, in terms of enhancing the refractive index and of polymerizability, particularly preferred is a radically polymerizable compound represented by formula (4). Still more preferred is a compound wherein $R^4$ is a methyl group.

The cyclic dithiocarbonate group of formula (1) contained in the radically polymerizable compound of the present invention has "—S—(C=O)—S—" structure. Generally, since sulfur atom in a "—CH$_2$—S—CH$_2$—" structure is easily oxidized, there are problems in stability that heat tinting is caused at the time of polymerization and curing reaction and that incomplete curing is caused due to deactivation of polymerization initiator. On the other hand, in the "—S—(C=O)—S—" structure in the present invention, an electron-attracting carbonyl group is present next to sulfur atom, the sulfur atom is not easily oxidized and therefore, the reaction involves little color tinting.

<Mercapto Compound of Formula (3)>

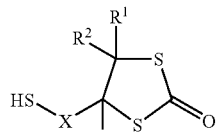

(3)

(In the formula, $R^1$ to $R^3$ and X represent the same as in formula (1))

The mercapto compound of formula (3) having a cyclic dithiocarbonate group serves as raw material for compound of formula (1). In formula (3), $R^1$ to $R^3$ and X represent the same as in formula (1) above. When all of $R^1$ to $R^3$ are hydrogen atoms and X is a methylene group in formula (3), the compound is CAS No. 96864-47-0.

Specific examples of mercapto compound of formula (3) include compounds represented by formulae (8) to (11) but are not limited thereto.

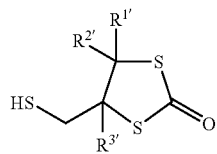

(8)

(In the formula, $R^{1'}$ to $R^{3'}$ each independently represents a hydrogen atom or a methyl group.)

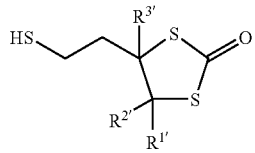

(9)

(In the formula, $R^{1'}$ to $R^{3'}$ each independently represents a hydrogen atom or a methyl group.)

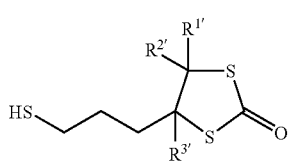

(10)

(In the formula, $R^{1'}$ to $R^{3'}$ each independently represents a hydrogen atom or a methyl group.)

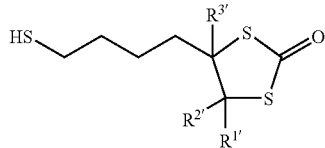

(11)

(In the formula, $R^{1'}$ to $R^{3'}$ each independently represents a hydrogen atom or a methyl group.)

Next, method for producing the mercapto compound of formula (3) of the present invention is explained.

The mercapto compound of formula (3) can be obtained by converting a compound having a halogen atom as mercapto group into a mercapto compound by a known method. For example, the mercapto compound of formula (3) can be obtained by reacting a compound having a halogen atom replacing the mercapto group in formula (3) with sodium hydrosulfide. The amount of sodium hydrosulfide used here is not particularly limited, but generally the amount is from 1 to 20 mol based on 1 mol of the compound having a halogen atom replacing the mercapto group in formula (3). Particularly, preferred amount is from 1 to 5 mol, more preferred is from 1 to 2 mol. If the amount is less than 1 mol, the reaction yield decreases while if the amount exceeds 20 mol, economic efficiency decreases.

In the reaction, generally solvent is used. Examples of solvent include hydrocarbon solvents such as n-hexane, toluene, xylene and benzene, ketone solvents such as acetone, methylethyl ketone and methylisobutyl ketone, ester-base solvents such as ethyl acetate and butyl acetate, ether-base solvent such as diethylether, diethyleneglycol dimethylether and tetrahydrofuran, halogen-base solvents such as dichloromethane, dichloroethane, chloroform and chlorobenzene, and polar solvents such as acetonitrile, N,N-dimethylformamide and dimethylsulfoxide. One of these solvents may be used singly or two or more of them may be used in combination.

The reaction temperature is not particularly limited, but generally is within a range of −20 to 100° C., preferably within a range of 0 to 50° C. If the temperature is less than −20° C., the reaction rate is extremely low while if the temperature exceeds 100° C., side reactions such as polymerization tend to occur.

The thus obtained mercapto compound represented by formula (3) can be purified by treatment of distillation, extraction, recrystallization or chromatography or treatment using activated carbon, activated clay, synthetic adsorbent or the like.

<Method for Producing a Radically Polymerizable Compound Represented by Formula (2)>

The radically polymerizable compound represented by formula (2) according to the present invention is produced by a known method of converting a mercapto compound of formula (3) as raw material into (meth)acrylic acid thioester.

The first example of method for producing a radically polymerizable compound of formula (2) is a method of esterifying a compound of (3) and (meth)acryloyl halide. The term "(meth)acryloyl halide" used here means a compound represented by formula (2) below.

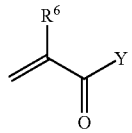

(12)

(In the formula, $R^6$ represents a hydrogen atom or a methyl group, and Y represents a chlorine atom or bromine atom.)

The amount of (meth)acryloyl halide of formula (12) to be reacted with the mercapto compound of formula (3) is not particularly limited. Generally, the amount is preferably 0.1 to 20 mol based on 1 mol of the mercapto compound, particularly preferably 0.5 to 5 mol. If the amount is less than 0.1 mol, the production yield decreases while the amount exceeding 20 mol is economically disadvantageous.

The reaction may be conducted without solvent or inert solvent may be used. Examples of inert solvent include hydrocarbon solvents such as n-hexane, toluene, xylene and benzene, ketone solvents such as acetone, methylethyl ketone and methylisobutyl ketone, ester-base solvents such as ethyl acetate and butyl acetate, ether-base solvent such as diethylether, diethyleneglycol dimethylether and tetrahydrofuran, halogen-base solvents such as dichloromethane, dichloroethane, chloroform and chlorobenzene, and polar solvents such as acetonitrile, N,N-dimethylformamide and dimethylsulfoxide. One of these solvents may be used singly or two or more of them may be used in combination.

The reaction temperature is not particularly limited, but generally is within a range of −20 to 100° C., preferably within a range of 0 to 50° C. If the temperature is lower than −20° C., the reaction rate is extremely low while if the temperature exceeds 100° C., side reactions such as polymerization tend to occur.

For the reaction, either of a method where the reaction is conducted without using any catalyst while removing by-produced hydrogen halide from the reaction system and a method where the reaction is conducted with hydrogen halide trapping agent may be employed.

Examples of hydrogen halide trapping agent include organic bases such as pyridine, triethylamine, picoline, dimethylaniline, diethylaniline, 1,4-diazabicyclo[2.2.2]octane and 1,8-diazabicyclo[5.4.0]undec-7-ene, and inorganic bases such as sodium hydroxide, potassium hydroxide, calcium hydroxide, magnesium hydroxide, sodium carbonate, potassium carbonate, lithium carbonate and sodium hydrogencarbonate.

The used amount of halide trapping agent is not particularly limited. Generally, the amount is 0.1 to 20 mol based on 1 mol of the mercapto compound of formula (3), preferably 0.5 to 5 mol.

Moreover, in the reaction, a polymerization inhibitor may be used for the purpose of suppressing polymerization.

Examples of polymerization inhibitor include quinones such as p-benzoquinone, naphthoquinone, 2,5-diphenyl-p-benzoquinone, polyhydric phenols such as hydroquinone, p-t-butyl catechol and 2,5-di-t-butylhydroquinone, and phenols such as hydroquinone monomethylether, di-t-butyl paracresol and α-naphthol.

The thus obtained polymerizable compound of formula (1) can be purified by treatment of distillation, extraction, recrystallization or chromatography or treatment using activated carbon, activated clay, synthetic adsorbent or the like.

Example of the second method for producing the radically polymerizable compound represented by formula (2) is a method where halopropionic acid thioester (formula (14)) is synthesized through reaction of a mercapto compound of formula (3) and acid halide (formula (13)) of halopropionic acids and then dehydrohalogenation is carried out (e.g. described in Japanese Patent Application Laid-Open Nos. H10-204056 and H02-172969), as shown in the reaction scheme (1) below.

Reaction Scheme (1)

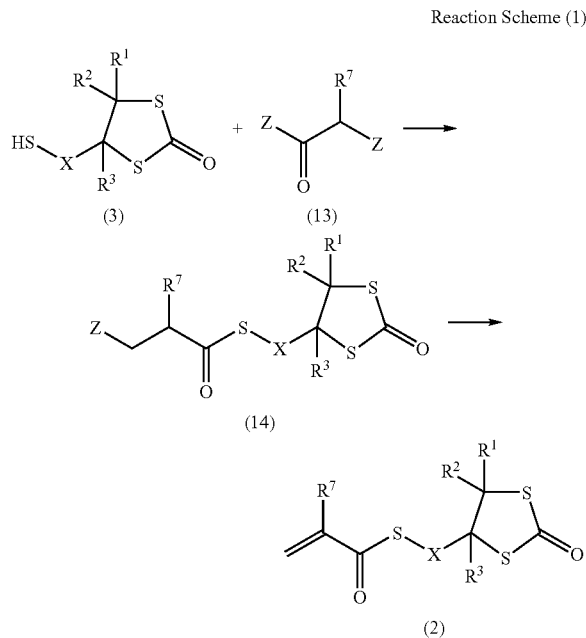

(In the formula, $R^1$ to $R^3$ each independently represents a hydrogen atom or an alkyl group having 1 to 4 carbon atoms, $R^7$ represents a hydrogen atom or a methyl group. X represents an alkylene group having 1 to 4 carbon atoms. Z represents a chlorine atom, bromine atom or an iodine atom.)

Firstly, synthesizing halopropionic acid thioester (formula (14)) through reaction of a mercapto compound of formula (3) and acid halide (formula (13)) of halopropionic acids in the reaction scheme (1) is described in detail.

In the reaction, the amount of the acid halide of halopropionic acids (such as 3-chloropropionic acid, 3-bromopropionic acid, 3-chloro-2-methylpropionic acid and 3-bromo-2-methylpropionic acid) to be reacted with the mercapto compound of formula (3) is not particularly limited. Generally, the preferable amount is 0.1 to 5 mol based on 1 mol of the mercapto compound, more preferably 0.2 to 3 mol, still more preferably 0.5 to 2 mol, particularly preferably, 0.8 to 1.5 mol.

The reaction may be conducted without solvent or may be conducted in an inert solvent. The solvent is not particularly limited as long as it is inactive to the reaction. For example, the reaction may be conducted in organic solvent or a mixture of these solvent. Examples of solvent include hydrocarbon solvents such as n-hexane, benzene and toluene, ketone solvents such as acetone, methylethyl ketone and methylisobutyl ketone, ester-base solvents such as ethyl acetate and butyl acetate, ether-base solvents such as diethylether, diethyleneglycol dimethylether, tetrahydrofuran and dioxane, halogen-base solvents such as dichloromethane, chloroform, carbon tetrachloride, 1,2-dichloroethane, tetrachloroethylene, chlorobenzene and ortho chlorobenzene, and polar solvents such as acetonitrile, N,N-dimethylformamide, N,N-dimethylimidazolidinone, dimethylsulfoxide and sulfolane. One of these solvents may be used singly or two or more of them may be used in combination.

The reaction temperature is not particularly limited, but generally, the temperature is preferably within a range of −78 to 150° C., more preferably within a range of −20 to 120° C., still more preferably within a range of 0 to 100° C.

The reaction may be conducted without any catalyst while removing by-produced halogenated hydrogen (such as hydrogen chloride) from the reaction system or a dehydrohalogenating agent may be used.

Examples of dehydrohalogenating agent include organic bases such as triethylamine, pyridine, picoline, dimethylaniline, diethylaniline, 1,4-diazabicyclo[2.2.2]octane (DABCO) and 1,8-diazabicyclo[5.4.0]undec-7-ene (DBU) and inorganic bases such as sodium hydrogen carbonate, sodium carbonate, potassium carbonate, lithium carbonate, sodium hydroxide, potassium hydroxide, calcium hydroxide and magnesium hydroxide.

The used amount of the dehydrohalogenating agent is not particularly limited. Generally, the amount is preferably 0.05 to 10 mol based on 1 mol of the mercapto compound of formula (3), more preferably 0.1 to 5 mol, particularly preferably 0.5 to 3 mol.

Next, method where halopropionic acid thioester compound (formula (14)) is subjected to dehydrohalogenation in the presence of base to thereby produce the radically polymerizable compound of formula (2) of the present invention in the reaction scheme (1) is described in detail.

Examples of base used in the reaction include organic bases such as methylamine, dimethylamine, triethylamine, pyridine, picoline, aniline, dimethylaniline, diethylaniline, toluidine, anisidine, 1,4-diazabicyclo[2.2.2]octane (DABCO) and 1,8-diazabicyclo[5.4.0]undec-7-ene (DBU), and inorganic bases such as sodium hydrogencarbonate, sodium carbonate, potassium carbonate, lithium carbonate, sodium hydroxide, potassium hydroxide, calcium hydroxide and magnesium oxide.

The amount of the base is not particularly limited. Generally, the amount is preferably 0.05 to 10 mol based on 1 mol of the halopropionic acid thioetser compound (formula (14)), more preferably 0.1 to 5 mol, particularly preferably 0.5 to 3 mol.

The reaction may be conducted without using any solvent or may be conducted in an inert solvent. The solvent is not particularly limited as far as the solvent is inactive to the reaction. For example, the reaction may be conducted using water, organic solvent or a mixture thereof.

Examples of the organic solvent include hydrocarbon solvents such as n-hexane, benzene, toluene and xylene, alcohol solvents such as methanol, ethanol, isopropanol, n-butanol, methoxyethanol, ethoxyethanol, butoxyethanol, diethyleneglycol monomethyl ether, diethyleneglycol monoethyl ether and diethyleneglycol monobutyl ether, ketone solvents such as acetone, methylethyl ketone and methylisobutyl ketone, ester-base solvents such as ethyl acetate and butyl acetate, ether-base solvents such as diethylether, diethyleneglycol dimethyl ether, tetrahydrofuran and dioxane, halogen-base solvents such as dichloromethane, chloroform, carbon tetrachloride, 1,2-dichloroethane, tetrachloroethylene, chlorobenzene and o-dichlorobenzene, and polar solvents such as acetonitrile, N,N-dimethylformamide, N,N-dimethylacetamide, N,N-dimethylimidazolidinone, dimethylsulfoxide and sulfolane. One of these solvents may be used singly or two or more of them may be used in combination.

The reaction temperature is not particularly limited, but generally, the temperature is preferably within a range of −78 to 150° C., more preferably within a range of −20 to 120° C., particularly preferably within a range of 0 to 100° C.

In the above described reaction process, the reaction method may employ a step-by-step approach where after the first step of thioesterification of halopropionic acid, halopropionic acid thioester compound represented by formula (14) as intermediate compound is isolated and then the second step of dehydrohalogenation is carried out. Alternatively, the reaction method may be a "one-pot" approach where dehydrohalogenation is carried out without isolating halopropionic acid thioester compound during the course of the reaction.

In case of adopting the step-by-step approach, isolation process of the halopropionic acid thioester compound represented by formula (14) obtained by the above-described method may involve any known isolation or purification method (such as distillation, recrystallization, chromatography or treatment with activated carbon) to impart high purity to the isolated compound.

In preparing a radically polymerizable compound represented by formula (2) in the present invention, it is preferable to use a polymerization inhibitor for the purpose of prevent reaction products from being polymerized during or after the reaction process.

Example of the polymerization inhibitor include known compounds such as 4-methoxyphenol, 2,6-di-tert-butyl cresol, hydroquinone and phenothiazine.

The used amount of the polymerization inhibitor is not particularly limited. Generally, the amount is preferably 0.001 to 5 mass parts based on 100 mass parts of mixture of the raw materials in the reaction system or 100 mass parts of the reaction product, more preferably 0.05 to 3 mass parts, particularly preferably 0.01 to 1 mass parts.

After completion of the reaction, the radically polymerizable compound of the present invention represented by formula (2) as the reaction product is isolated through post-treatment by known operation and method (such as neutralization, solvent extraction, water rinsing, liquid separation and solvent evaporation).

<Polymer of Radically Polymerizable Compound of Formula (1)>

The radically polymerizable compound of formula (1) in the present invention can be easily polymerized by radical polymerization with heat, ultraviolet ray, electron beam or the like.

Also, copolymer may be prepared by polymerization with other radically polymerizable compounds. In a case where the radically polymerizable compound of formula (1) or other radically polymerizable compound has a polyfunctional radical-polymerizability, the obtained polymer will have a crosslinked structure and the polymer may be called a cured product.

Examples of the other radically polymerizable compounds include allyl esters such as di(meth)allyl phthalate, di(meth)allyl isophthalate, di(meth)allyl terephthalate, (meth)allyl benzoate, (meth)allyl α-naphthoate, (meth)allyl β-naphthoate, (meth)allyl 2-phenylbenzoate, (meth)allyl 3-phenylbenzoate, (meth)allyl 4-phenylbenzoate, (meth)allyl o-chlorobenzoate, (meth) allyl m-chlorobenzoate, (meth) allyl p-chlorobenzoate, (meth)allyl o-bromobenzoate, (meth)allyl m-bromobenzoate, (meth)allyl p-bromobenzoate, (meth)allyl 2,6-dichlorobenzoate, (meth)allyl 2,4-dichlorobenzoate, (meth)allyl 2,4,6-tribromobenzoate, di(meth)allyl 1,4-cyclohexane dicarboxylate, di(meth)allyl 1,3-cyclohexane dicarboxylate, di(meth)allyl 1,2-cyclohexane dicarboxylate, di(meth)allyl 1-cyclohexene-1,2-dicarboxylate, di(meth)allyl 3-methyl-1,2-cyclohexane dicarboxylate, di(meth)allyl 4-methyl-1,2-cyclohexane dicarboxylate, di(meth)allyl endate, di(meth)allyl chlorendate, di(meth)allyl 3,6-methylene-1,2-cyclohexane dicarboxylate, tri(meth)allyl trimellitate, di(meth)allyl diphenate, di(meth)allyl succinate and di(meth)allyl adipate;

maleic acid and fumaric acid esters such as dibenzyl maleate, dibenzyl fumarate, diphenyl maleate, diphenyl fumarate, dibutyl maleate, dibutyl fumarate, dimethoxyethyl maleate and dimethoxyethyl fumarate;

(meth)acrylic acid esters such as methyl(meth)acrylate, ethyl(meth)acrylate, n-butyl(meth)acrylate, i-butyl(meth)acrylate, t-butyl(meth)acrylate, 2-ethylhexyl (meth)acrylate, phenyl(meth)acrylate, stearyl(meth)acrylate, lauryl(meth)acrylate, benzyl(meth)acrylate, isobornyl (meth)acrylate, trimethylolpropane tri(meth)acrylate, ethyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, polyethyleneglycol di(meth)acrylate, pentaerythritol tetra(meth)acrylate, ditrimethylolpropane tetra(meth)acrylate, dipentaerythritol hexa (meth)acrylate, dipentaerythritol penta(meth)acrylate, dicyclopentanyl (meth)acrylate, dicyclopentenyl (meth)acrylate, dicyclopentenyloxyethyl (meth)acrylate, tricyclodecane dimethanol di(meth)acrylate, ethoxylated cyclohexane dimethanol dimethacrylate, adamantyl(meth)acrylate, cyclohexyl (meth)acrylate and tetrahydrofurfuryl(meth)acrylate;

aromatic vinyl compounds such as styrene, α-methyl styrene, methoxystyrene and divinylbenzene;

vinyl esters of aliphatic carboxylic acids such as vinyl acetate, vinyl propionate, vinyl butyrate, vinyl pivalate, vinyl stearate and vinyl caproate;

vinyl esters of alicyclic carboxylic acid such as cyclohexane carboxylic acid vinyl ester;

vinyl esters of aromatic carboxylic acid such as vinyl benzoate and vinyl t-butylbenzoate;

allyl carbonate compounds such as diallylcarbonate, diethyleneglycol bis(allyl carbonate) and polyethyleneglycol bis (allyl carbonate) resin typically represented by CR-39 (product name) manufactured by PPG Industries;

oligomers having a (meth)allyl ester group at a terminal with its inside consisting of an ester structure derived from polyvalent carboxylic acid and polyhydric alcohol; and nitrogen-containing polyfunctional allyl compounds such as triallyl isocyanurate and triallyl cyanurate.

The "other radically polymerizable compounds" are not limited to the above examples. Moreover, two or more kinds of these compounds may be used in combination in order to obtain the target properties.

Among the above radically polymerizable compounds, in terms of enhancing the Abbe number of the polymerized product, preferred are non-aromatic radically polymerizable compounds having no aromatic group in molecules. Low Abbe number causes problems such as faint vision at edges and therefore for lens material, the higher the Abbe number, the more preferable.

Any radical polymerization initiator may be used as long as the initiator generates radicals when heat, ultraviolet ray, electron beam, radiant ray or the like is irradiated.

Examples of radical polymerization initiator usable upon radical polymerization by heat include azo compounds such as 2,2'-azobis isobutyronitrile and 2,2'-azobis isovaleronitrile, ketone peroxides such as methylethylketoneperoxide, methyl isobutyl ketone peroxide and cyclohexanone peroxide diacyl peroxides such as benzoyl peroxide, decanoyl peroxide and lauroyl peroxide, dialkyl peroxides such as dicumyl peroxide, t-butylcumyl peroxide and di-t-butyl peroxide, peroxy ketals such as 1,1-di-t-butylperoxycyclohexane, 2,2-di(t-butylperoxy)butane alkyl peroxy esters such as t-butyl peroxypivalate, t-butyl peroxy-2-ethyl-hexanoate, t-butyl peroxyisobutyrate, di-t-butyl peroxyhexahydroterephthalate, di-t-butyl peroxyazelate, t-butyl peroxy-3,5,5-trimethylhexanoate, t-butyl peroxyacetate, t-butyl peroxybenzoate and di-t-butyl peroxytrimethyladipate, and peroxycarbonates such as diisopropylperoxy dicarbonate, di-sec-butyl peroxydicarbonate and t-butyl peroxyisopropylcarbonate.

Examples of radical polymerization initiator usable upon radical polymerization by ultraviolet ray, electron beam or radiant ray include acetophenone derivatives such as acetophenone, 2,2-dimethoxy-2-phenyl acetophenone, diethoxy acetophenone, 1-hydroxy-cyclohexyl-phenylketone and 2-methyl-1-[4-(methylthio)phenyl]-2-morpholinopropanone-1,2-benzyl-2-dimethylamino-1-(4-morpholinophenyl)-butanone-1,2-hydroxy-2-methyl-1-phenyl-propane-1-one, benzophenone derivatives such as benzophenone, 4,4'-bis(dimethylamino)benzophenone, 4-trimethylsilyl benzophenone and 4-benzoyl-4'-methyl-diphenyl sulfide, benzoin derivatives such as benzoin, benzoin ethyl ether, benzoin propyl ether, benzoin isobutyl ether, and benzoin isopropylether, methylphenyl glyoxylate, benzoin dimethyl ketal, and 2,4,6-trimethylbenzoyl diphenyl phosphine oxide.

The blending amount of the polymerization initiator depends on the curing temperature, the composition ratio of radically polymerizable composition and the type and amount of additives and cannot be flatly defined. Generally, the amount of the polymerization initiator is preferably 0.01 to 15 mass parts based on 100 mass parts of the total amount of the radically polymerizable compound of formula (1) in the present invention and other radically polymerizable compound, more preferably 0.1 to 10 mass parts. If the radical polymerization initiator is less than 0.01 mass parts, polymerization and curing might not proceed satisfactorily while the amount exceeding 15 mass parts is economically unpreferable.

The polymerization temperature (curing temperature) may be selected according to the type of the polymerization initiator. In case of polymerization using ultraviolet ray, room temperature may be selected. In case of thermal polymerization, the temperature is preferably determined appropriately according to the decomposition temperature of the initiator. Generally, temperature from 30 to 130° C. is preferred. Also, polymerization (curing) may be carried out with the temperature being changed stepwise. In polymerization process, inert solvent may be used.

The resin obtained by polymerizing the radically polymerizable compound of formula (1) in the present invention has high transparency and can be expected to be used as resin for optical material with high refractive index.

<Composition for Optical Material>

The composition for optical material is a polymerized (cured) composition containing the radically polymerizable compound of formula (1). If necessary, the composition may contain a radical polymerization initiator and other radically polymerizable compound.

Also, composition containing polyfunctional radically polymerizable compound, which can be cross-linked, is more preferred in use for optical material.

With respect to the other radically polymerizable compound, radical polymerization initiator and method for polymerization (curing), the same as described above in the paragraph regarding the radically polymerizable compound of formula (1) is applicable. However, it is preferable to avoid using a solvent, which involves a problem of removal from the cured product.

The blending amounts of the radically polymerizable compound of formula (1) and other radically polymerizable compound in the composition are not particularly limited. In a case where the composition is to be used as polymerized optical material and curing method involves casting, for the purpose of making the casting step easier, viscosity may be adjusted by appropriately blending radically polymerizable monomer as reactive diluent. The viscosity is preferably 600 mPa·s or less at the temperature when the casting step is conducted, more preferably 300 mPa·s or less, particularly preferably 200 mPa·s or less. The viscosity is measured in accordance with JIS Z8803.

Also, in the composition for optical material according to the present invention, various known additives such as UV absorber, antioxidant, mold-releasing agent, colorant (pigment and dye), leveling agent and inorganic filler may be used.

Examples of UV absorber include triazoles such as 2-(2'-hydroxy-tert-butylphenyl)benzotriazole, benzophenones such as 2,4-dihydroxybenzophenone, salicylates such as 4-tert-butylphenyl salicylate and hindered amines such as bis(2,2,6,6-tetramethyl-4-piperidinyl)sebacate.

The blending amount of the UV absorber depends on the types and amounts of other components blended in the composition. Generally, the amount of the UV absorber is preferably 0.01 to 2 mass parts based on 100 mass parts of the total amount of radically polymerizable components in the composition for optical material, more preferably, 0.03 to 1.7, most preferably 0.05 to 1.4 mass parts. If the amount of the UV absorber is less than 0.01 mass parts, sufficient effect cannot be expected while the amount exceeding 2 mass parts is economically unpreferred.

Examples of antioxidant include phenol-base agents such as 2,6-di-tert-butyl-4-methylphenol, tetrakis-[methylene-3-(3',5'-di-tert-butyl-4-hydroxyphenyl)propionate]methane, sulfur-base agents such as dilauryl-3,3'-thiodipropionate and phosphorus-base agents such as trisnonylphenyl phosphite.

The blending amount of the antioxidant depends on the types and amounts of other components blended in the composition. Generally, the amount of the antioxidant is preferably 0.01 to 5 mass parts based on 100 mass parts of the total amount of radically polymerizable components in the composition for optical material, more preferably, 0.05 to 4, most preferably 1 to 3 mass parts. If the amount of the antioxidant is less than 0.01 mass parts, sufficient effect cannot be expected while the amount exceeding 5 mass parts is economically unpreferred.

Examples of mold-releasing agent include stearic acid, butyl stearate, zinc stearate, stearic acid amide, fluorine-base compounds and silicone compounds.

The blending amount of the mold-releasing agent depends on the types and amounts of other components blended in the composition. Generally, the amount of the mold-releasing agent is preferably 0.01 to 2 mass parts based on 100 mass parts of the total amount of radically polymerizable components in the composition for optical material, more preferably, 0.03 to 1.7, most preferably 0.05 to 1.4 mass parts. If the amount of the mold-releasing agent is less than 0.01 mass parts, sufficient effect cannot be expected while the amount exceeding 2 mass parts is economically unpreferred.

Examples of colorant include organic pigments such as anthraquinone, azo, carbonium, quinoline, quinoneimine, indigoid and phthalocyanine, organic dyes such as azoic dye and sulfur dye, and inorganic pigments such as titan yellow, iron oxide yellow, zinc yellow, chrome orange, molybdenum red, cobalt violet, cobalt blue, cobalt green, chromium oxide, titanium oxide, zinc sulfate and carbon black. The blending amount of the colorant is not particularly limited.

In a case where the composition for optical material according to the present invention is formed into optical material such as plastic lens, cast molding is appropriate as molding/processing method. Specifically, a method where a radical polymerization initiator is added to the composition, the composition is cast into a mold fixed by an elastomer gasket or a spacer, and then the composition is thermally cured in a oven may be employed.

In this occasion, material usually used for the mold is metal or glass. Generally, a mold for plastic lens needs washing after cast-molding and usually used as detergent is strong alkali liquid or strong acid. Glass, unlike metal, which does not deteriorate in quality by washing and can be easily polished to obtain a smooth surface, is preferably used.

The curing temperature at the time of forming the composition for optical material according to the present invention into plastic lens or the like depends on the composition ratio of the composition and the types and the amounts of additives. Generally, the temperature is about 20 to 150° C., preferably 30 to 120° C.

With respect to operation controlling the curing temperature, a method where curing proceeds by increasing the temperature gradually is preferred in consideration for shrinkage or distortion during the curing process. Generally, it is preferable that curing is completed over 0.5 to 100 hours, more preferably 3 to 50 hours, still more preferably 10 to 30 hours.

EXAMPLES

The present invention will now be explained more specifically with reference to the examples, but is not particularly limited to the following examples.

Physical properties of the substances synthesized in Examples and Comparative Examples were measured by the method described below.

1. Refractive Index ($n_D$) and Abbe Number

Instrument used for measurement: Abbe Refractometer 1T, product of Atago Co., Ltd.

Measuring method: Samples having a size of 9 mm×16 mm×4 mm were prepared, and refractive index ($n_D$) and Abbe number ($v_D$) at 25° C. were measured using Abbe Refractometer 1T. Diiodomethane was used as contact liquid.

2. $^1$H-NMR

Instrument used for measurement: JEOL EX-400 (400 MHz), product of JEOL Ltd.

Measuring method: The liquid obtained in Examples was dissolved in deuterated chloroform and tetramethylsilane was used as an internal reference material.

3. FT-IR

Instrument used for measurement: Spectrum GX, product of PerkinElmer Japan Co., Ltd.

Measuring method: FT-IR of the obtained liquid was measured by liquid membrane method using potassium bromide plates.

Example 1

Synthesis of 4-chloromethyl-1,3-dithiolane-2-one

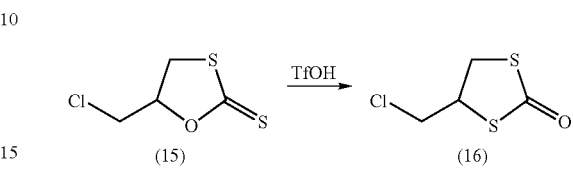

In a round-bottom flask equipped with a Dimroth condenser, a stirrer and a thermometer, 5-chloromethyl-1,3-oxathiolane-2-thione (formula (15))(500 g, 2.96 mol), trifluoromethane sulfonic acid (4.44 g, 0.029 mol) and toluene (500 ml) were charged in nitrogen atmosphere. The flask was heated to slowly reflux the content, and the liquid reactant was cooled in four hours after the beginning of reflux. Aqueous sodium hydroxide was added to the liquid reactant and the mixture was subjected to washing and liquid separation several times followed by a few more operations of washing and liquid separation using water. The organic layer was dried with anhydrous sodium sulfate and filtrated, and then a low-boiling point substance was removed using an evaporator. The obtained reactant was subjected to distillation under reduced pressure (boiling point: 76.5° C./24 Pa) and 399.5 g of pale yellow transparent liquid was obtained (yield: 79.9%). $^1$H-NMR and FT-IR of the obtained liquid were measured and the liquid was identified as the object compound, 4-chloromethyl-1,3-dithiolane-2-one (Formula 16).

Example 2

Synthesis of 4-mercaptomethyl-1,3-dithiolane-2-one

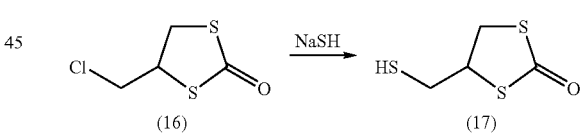

In a round-bottom flask equipped with a stirrer and a thermometer, 4-chloromethyl-1,3-dithiolane-2-one (formula (16)) (131.86 g, 0.78 mol), diethyleneglycol dimethylether (493 g) were charged and placed under nitrogen atmosphere. 70% aqueous sodium hydrosulfide (62.6 g, 0.78 mol equivalent as sodium hydrosulfide) was added in several batches to the liquid reactant over seven hours. Subsequently, after 35 mass % aqueous hydrochloric acid (4.47 g) was added for neutralization, precipitated insoluble part was removed by filtration. A low-boiling point substance was removed from the obtained liquid reactant by distillation to obtain pale yellow viscous liquid (yield: 112.7 g).

As a result of distillation of the obtained pale yellow viscous liquid under reduced pressure (boiling point: 121° C./40 Pa), transparent and colorless liquid was obtained (yield: 40.3 g; on the basis of 105.5 g charged amount of the pale yellow viscous liquid). $^1$H-NMR and FT-IR of the obtained liquid were measured and the liquid was identified as the object compound, 4-mercaptomethyl-1,3-dithiolane-2-one (formula (17)).

Example 3

Synthesis of S-[4-(1,3-dithiolane-2-on)-yl-methyl] methacrylthioate

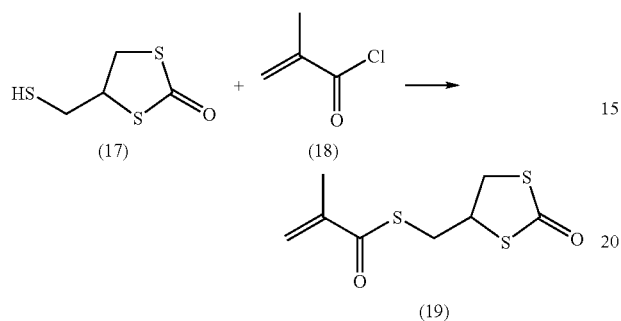

In a round-bottom flask equipped with a stirrer, a dripping funnel and a thermometer, the compound obtained in Example (2) and represented by formula (17) (20.04 g, 0.12 mol), pyridine (12 ml, 0.15 mol) and dimethylformamide (400 ml) were charged and placed under nitrogen atmosphere. The solution was cooled with ice water down to 2° C. and methacryloyl chloride (formula (18), 11 ml, 0.15 mol) was added dropwise and the mixture was stirred for five hours and warmed up to room temperature, followed by further stirring for 18 hours. Ethyl acetate was added to the liquid reactant and the mixture was subjected to washing and separation using water. The organic layer was dried with anhydrous sodium sulfate and filtrated. Hydroquinone (147 mg) was added to the obtained organic layer and then a low-boiling point substance was removed using an evaporator to obtain pale yellow liquid (yield: 27.09 g).

The obtained pale yellow liquid was subjected to distillation under reduced pressure (boiling point: 141-147° C./26.6 Pa) to obtain transparent and colorless liquid (yield: 8.7 g on the basis of 27 g charged amount of the transparent and colorless liquid). $^1$H-NMR and FT-IR of the obtained liquid were measured and the liquid was identified as the object compound, S-[4-(1,3-dithiolane-2-on)-yl-methyl]methacrylthioate (Formula 19).

Example 4

Curing of the Compound Represented by Formula (19)

To the compound obtained in Example 3 and represented by formula (19) (1.5 g), dicumylperoxide (PERCUMYL D, Product of NOF Corporation, 45.9 mg), which is an initiator of radical polymerization, was added and the mixture was cast into a 4 mm thick mold made of two glass plates and a silicone tube spacer. The mixture was placed in an oven and cured following the curing temperature program wherein the mixture was heated at 50° C. for two hours, heated to 100° C. over two hours and maintained at 100° C. for another two hours.

The obtained cured product was colorless transparent. The optical properties of the product were measured. The results are shown in Table 1.

Example 5

Curing of the Compound Represented by Formula (19) and Another Radically Polymerizable Monomer The compound obtained in Example 3 and represented by formula (19) (1.06 g), n-butyl methacrylate (product of Wako Pure Chemical Industries, Ltd., 0.44 g) and dicumylperoxide (PERCUMYL D, Product of NOF Corporation, 41.4 mg), which is an initiator of radical polymerization, were mixed and the mixture was cast into a 4 mm thick mold made of two glass plates and a silicone tube spacer. The mixture was placed in an oven and cured following the curing temperature program wherein the mixture was heated at 50° C. for two hours, heated to 100° C. over two hours and maintained at 100° C. for another two hours.

The obtained cured product was colorless transparent. The optical properties of the product were measured. The results are shown in Table 1.

Example 6

Curing of the Compound Represented by Formula (19) and Another Radically Polymerizable Monomer The compound obtained in Example 3 and represented by formula (19) (1.23 g), ethoxylated cyclohexanedimethanol dimethacrylate (NK ester CHD-4E, product of Shin-Nakamura Chemical Co., Ltd., 0.82 g) and dicumylperoxide (PERCUMYL D, Product of NOF Corporation, 61.5 mg), which is an initiator of radical polymerization, were mixed and the mixture was cast into a 4 mm thick mold made of two glass plates and a silicone tube spacer. The mixture was placed in an oven and cured following the curing temperature program wherein the mixture was heated at 50° C. for two hours, heated to 100° C. over two hours and maintained at 100° C. for another two hours.

The obtained cured product was colorless transparent. The optical properties of the product were measured. The results are shown in Table 1.

Example 7

Curing of the Compound Represented by Formula (19) and Another Radically Polymerizable Monomer The compound obtained in Example 3 and represented by formula (19) (1.17 g), dicyclopentanyl methacrylate (FA-513M, product of Hitachi Chemical Company, Ltd., 0.79 g) and initiators of radical polymerization, 1,1,3,3-tetramethylbutylperoxy-2-ethyl hexanoate (PEROCTA O, product of NOF Corporation, 9.8 mg) and 1,1-di(t-hexylperoxy)-3,3,5-trimethylcyclohexane (PERHEXA TMH, Product of NOF Corporation, 9.8 mg) were mixed and the mixture was cast into a 4 mm thick mold made of two glass plates and a silicone tube spacer. The mixture was placed in an oven and cured following the curing temperature program wherein the mixture was heated at 50° C. for two hours, heated to 100° C. over two hours and maintained at 100° C. for another two hours.

The obtained cured product was colorless transparent. The optical properties of the product were measured. The results are shown in Table 1.

Comparative Example 1

Curing of 5-(1,3-oxathiolane-2-thion)-yl-methyl methacrylate

The compound represented by formula (20) (5-(methacryloyloxy)methyl-1,3-oxathiolane-2-thione) was synthesized according to the referential production example 2 described in Japanese Patent Application Laid-open No. 2005-36084.

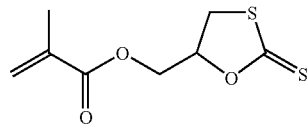

(20)

To the compound represented by formula (20) (2.2 g) was added dicumylperoxide (Product of NOF Corporation, PERCUMYL D, 65 mg), which is an initiator of radical polymerization, and the mixture was cast into a 4 mm thick mold made of two glass plates and a silicone tube spacer while being heated. The mixture was placed in an oven and cured following the curing temperature program wherein the mixture was heated at 100° C. for one hour, heated to 130° C. over one hour and maintained at 130° C. for another two hours.

The obtained cured product was brown transparent. The optical properties of the product were measured. The results are shown in Table 1.

TABLE 1

|  | refractive index ($n_D$) at 25° C. | Abbe number ($v_D$) at 25° C. | Color |
| --- | --- | --- | --- |
| Example 4 | 1.6553 | 34.6 | Colorless transparent |
| Example 5 | 1.6017 | 36.6 | Colorless transparent |
| Example 6 | 1.5910 | 36.5 | Colorless transparent |
| Example 7 | 1.5965 | 37.5 | Colorless transparent |
| Comparative Example 1 | 1.5980 | 35.8 | Brown transparent |

As seen in the above results, the radically polymerizable compound and the cured product obtained from the composition for an optical material of the present invention have a high refractive index and useful as an optical material.

The invention claimed is:

1. A radically polymerizable compound, comprising a group represented by formula (1) and a radically polymerizable double bond:

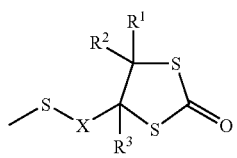

(1)

wherein $R^1$ to $R^3$ each independently represents a hydrogen atom or an alkyl group having 1 to 4 carbon atoms, X represents an alkylene group having 1 to 4 carbon atoms.

2. The radically polymerizable compound according to claim 1, wherein $R^1$ to $R^3$ in the formula are hydrogen atoms and X is a methylene group.

3. The radically polymerizable compound according to claim 1, which is represented by formula (2):

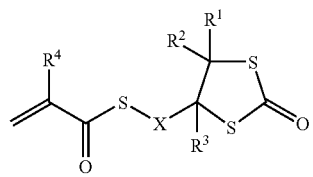

(2)

wherein $R^1$ to $R^3$ each independently represents a hydrogen atom or an alkyl group having 1 to 4 carbon atoms, X represents an alkylene group having 1 to 4 carbon atoms, $R^4$ represents a hydrogen atom or an alkyl group having 1 to 4 carbon atoms.

4. The radically polymerizable compound according to claim 3, wherein $R^1$ to $R^3$ in formula (2) are hydrogen atoms, $R^4$ is a methyl group and X represents a methylene group.

5. A polymer of the radically polymerizable compound as described in claim 1.

6. A copolymer of the radically polymerizable compound as described in claim 1 and other radically polymerizable compounds.

7. A copolymer of the radically polymerizable compound as described in claim 1 and at least one radically polymerizable monomer selected from the group consisting of methyl (meth)acrylate, ethyl(meth)acrylate, n-butyl(meth)acrylate, i -butyl(meth)acrylate, t-butyl(meth)acrylate, 2-ethylhexyl (meth)acrylate, lauryl(meth)acrylate, stearyl(meth)acrylate, isobornyl (meth)acrylate, cyclohexyl (meth)acrylate, tetrahydro furfuryl (meth)acrylate, trimethylolpropane tri(meth)acrylate, dicyclopentanyl (meth)acrylate, dicyclopentenyl (meth)acrylate, dicyclopentenyloxy ethyl(meth)acrylate, ethyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, polyethyleneglycol di(meth)acrylate, tricyclodecane dimethanol di(meth)acrylate and ethoxylated cyclohexane dimethanol di(meth)acrylate.

8. A composition for optical material containing the radically polymerizable compound described in claim 1.

9. A method for producing the radically polymerizable compound described in claim 3, wherein a mercapto compound represented by formula (3) is allowed to react with a (meth)acryloyl halide:

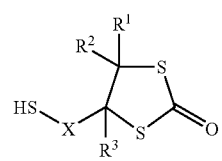

(3)

wherein $R^1$ to $R^3$ each independently represents a hydrogen atom or an alkyl group having 1 to 4 carbon atoms, X represents an alkylene group having 1 to 4 carbon atoms.

10. A method for producing the radically polymerizable compound described in claim 3, wherein a mercapto compound represented by formula (3) is allowed to react with a halide of halopropionic acid to prepare halopropionic acid thioester and then the halopropionic acid thioester is subjected to dehydrohalogenation:

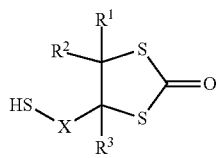

(3)

wherein R¹ to R³ each independently represents a hydrogen atom or an alkyl group having 1 to 4 carbon atoms, X represents an alkylene group having 1 to 4 carbon atoms.

11. A mercapto compound represented by formula (3):

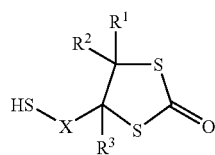

(3)

wherein R¹ to R³ each independently represents a hydrogen atom or an alkyl group having 1 to 4 carbon atoms, and X represents an alkylene group having 1 to 4 carbon atoms, wherein at least one of R¹ to R³ in formula (3) is not a hydrogen atom.

12. A mercapto compound represented by formula (3):

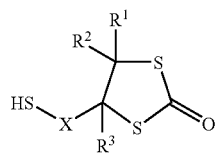

(3)

wherein R¹ to R³ each independently represents a hydrogen atom or an alkyl group having 1 to 4 carbon atoms, and wherein X in formula (3) is a methylene group.

13. A mercapto compound represented by formula (3):

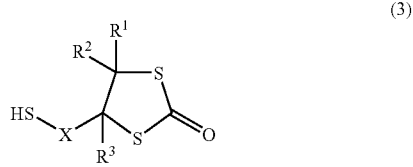

(3)

wherein R¹ to R³ each independently represents a hydrogen atom or an alkyl group having 1 to 4 carbon atoms, wherein at least one of R¹ to R³ in formula (3) is not a hydrogen atom and X is a methylene group.

14. The composition for optical material described in claim 8, which is used in light waveguide, optical lens, optical sealant, optical adhesive, optical film or light guide plate.

15. A light waveguide obtained from the composition for optical material described in claim 8.

16. An optical lens obtained from the composition for optical material described in claim 8.

17. An optical sealant obtained from the composition for optical material described in claim 8.

18. An optical adhesive obtained from the composition for optical material described in claim 8.

19. An optical film obtained from the composition for optical material described in claim 8.

20. An optical light guide plate obtained from the composition for optical material described in claim 8.

\* \* \* \* \*